US012676669B2

(12) United States Patent
McClean et al.

(10) Patent No.: US 12,676,669 B2
(45) Date of Patent: Jul. 7, 2026

(54) SHARED OTDR RESOURCE

(71) Applicant: II-VI Delaware, Inc., Wilmington, DE (US)

(72) Inventors: Ian Peter McClean, Brixham (GB); Siegfried Fleischer, Los Gatos, CA (US)

(73) Assignee: II-VI Delaware, Inc., Wilmington, DE (US)

( * ) Notice: Subject to any disclaimer, the term of this patent is extended or adjusted under 35 U.S.C. 154(b) by 140 days.

(21) Appl. No.: 18/390,663

(22) Filed: Dec. 20, 2023

(65) Prior Publication Data

US 2025/0211328 A1 Jun. 26, 2025

(51) Int. Cl.
*H04B 10/08* (2006.01)
*H04B 10/071* (2013.01)

(52) U.S. Cl.
CPC .................................. *H04B 10/071* (2013.01)

(58) Field of Classification Search
CPC ............... H04B 10/071; H04B 10/073; H04B 10/0795; H04B 10/0771; H04B 10/07955; H04B 10/0791; H04B 10/40; H04B 10/25; H04B 10/07953; G01M 11/3145; G01M 11/3136; G01M 11/3154; H04Q 11/0067
USPC ........ 398/16, 10, 13, 17, 21, 25, 26, 27, 33, 398/38, 135, 136, 66, 67, 68, 69, 70, 71, 398/72, 79, 45, 48, 49; 356/73.1
See application file for complete search history.

(56) References Cited

U.S. PATENT DOCUMENTS

| | | | | |
|---|---|---|---|---|
| 9,042,723 B2* | 5/2015 | Dahlfort | ............ | G01M 11/3136 |
| | | | | 398/16 |
| 9,143,228 B2* | 9/2015 | Sandstrom | ......... | H04B 10/2589 |
| 9,240,855 B1* | 1/2016 | Lam | ................... | G01M 11/3109 |
| 10,110,302 B2 | 10/2018 | Mansouri Rad et al. | | |
| 10,200,118 B2 | 2/2019 | Ruchet | | |
| 10,969,302 B1 | 4/2021 | Xu | | |
| 11,199,473 B2* | 12/2021 | Iida | ................... | G01M 11/3118 |
| 11,569,924 B2 | 1/2023 | Loprieno et al. | | |
| 11,646,789 B2 | 5/2023 | Cuenot | | |
| 2014/0111795 A1* | 4/2014 | Barnhart | ............ | G01M 11/3145 |
| | | | | 356/73.1 |
| 2018/0316419 A1 | 11/2018 | Watte et al. | | |
| 2019/0097719 A1 | 3/2019 | Chedore et al. | | |
| 2020/0195365 A1 | 6/2020 | Miyabe et al. | | |

(Continued)

FOREIGN PATENT DOCUMENTS

| | | |
|---|---|---|
| EP | 1 524 781 | 11/2008 |
| WO | WO 2022/211898 | 10/2022 |

*Primary Examiner* — Hanh Phan
(74) *Attorney, Agent, or Firm* — McAndrews, Held & Malloy, Ltd.

(57) ABSTRACT
A shared OTDR resource is disclosed that utilizes a combination of a pluggable OTDR and incorporated 1×N optical switch to allow for OTDR measurement and monitoring functionality to be shared between a plurality of N separate optical fibers that are used as communication paths between a pair of optical nodes (for example, a plurality of individual fiber spans used to interconnect a pair of data centers). The capability to maintain the OTDR functionality within a small form factor pluggable housing (e.g., QSFP, OSFP, or the like) in combination with the switch results in a shared OTDR resource that remains pluggable, and allows for increased flexibility in how this resource is shared among the various fibers.

16 Claims, 4 Drawing Sheets

(56) References Cited

U.S. PATENT DOCUMENTS

2020/0374001 A1    11/2020  Chedore et al.
2023/0152183 A1*    5/2023  Cahill  .................. H04B 10/071
                                                    356/73.1

* cited by examiner

SHARED OTDR RESOURCE

TECHNICAL FIELD

Disclosed herein is an optical time domain reflectometer (OTDR) that enables the OTDR functionality to be provided as a pluggable module, such as in a small form factor pluggable (SFP) form in combination with an optical switch that enables the OTDR functionality to be shared among a plurality of individual fiber spans.

BACKGROUND

OTDRs are used extensively to determine optical fiber characteristics such as attenuation, reflections, and the like, in order to optimize the working levels of associated transmitter and receiver equipment. An OTDR module typically includes an optical source used to generate a probe lightwave that is coupled into an optical fiber span being analyzed, and an optical receiver for detecting reflected light attributed to the probe lightwave that re-enters the OTDR from the fiber span under evaluation. A processing module utilizes information associated with the probe lightwave (e.g., in the case of using probe pulses, the timing information associated with the pulse train) and the optical power in the return back-reflected light to create an output (typically referred to as an OTDR trace) that defines the overall loss along the fiber span, as well as an identification of any physical changes/reflection points (e.g., connectors, splices, and the like) that may be present along the measured span.

One concern with many conventional OTDR arrangements is the overall size of the unit, which significantly impacts its ability to be formed as a "pluggable" component (for the purposes of this disclosure, the term "pluggable" means an optical component that may be located in an equipment assembly with other components. In one example, an equipment assembly in the form of a router may be configured to include backplane connections for the example OTDR, as well as one or more optical transceivers, providing flexible network design.

Additionally, there is an incentive to control costs by sharing OTDR functionality among a group of defined transceivers. While there exists a few configurations where a traditional OTDR assembly is connected to an optical switch, the resulting arrangement is relatively large, typically taking the form of a daughterboard on an embedded linecard, or a full rack in an equipment bay. As a result, conventional designs for implementing a switchable OTDR are at odds with the desire to provide a compact, pluggable solution.

SUMMARY OF THE DISCLOSURE

A shared OTDR resource is proposed that is based upon the utilization of a pluggable OTDR element which satisfies the need to utilize small form factor modules. A 1×N optical switch is integrated with the pluggable OTDR element (particularly, coupled to the output of the pluggable OTDR element) and controlled to select a particular fiber span from among a plurality of individual fiber spans for OTDR testing. Each fiber span needs only an optical coupler (for example, a wavelength division multiplexer (WDM)) to provide the coupling between the shared OTDR resource and the fiber span.

A process controller within the pluggable OTDR element is preferably used to control the operation of the 1×N switch in a manner which maintains the identity of the selected fiber span under test. In one example procedure, conventional data transmission along the selected fiber span may be "paused" by the controller and the generated OTDR trace stored in association with identification information of the fiber span under test. Alternatively, it is possible to take an OTDR measurement at the same time that data is being transmitted along the selected span.

In one embodiment, a 1×N switch may be coupled to an existing pluggable OTDR element, with the OTDR element then configured to provide the switch control. Alternatively, the 1×N switch may be incorporated within a module of the pluggable OTDR during its assembly; in particular, incorporated within a designated "passive" module that includes the elements utilized to direct signal flow between the OTDR and the fiber span.

An example of the disclosed shared OTDR resource may take the form of a pluggable OTDR element for producing an optical probe beam thereafter directed into an optical fiber to be evaluated and generating an OTDR trace from optical reflections returned to the pluggable OTDR element from the optical fiber, a 1×N optical switch coupled to the output of the pluggable OTDR element, where each one of a plurality of N separate output paths from the 1×N optical switch is coupled to a separate one of the plurality of N individual optical fiber spans, and a controller module for providing a fiber span selection control signal to the 1×N optical switch for determining, as a function of time, a specific optical fiber span for OTDR testing.

In some example embodiments, the controller module may be incorporated within the pluggable OTDR element. In particular, the controller module may be located within an "active" module portion of the pluggable OTDR element that houses the probe beam source (and driver) as well as the photodetector for capturing the return probe reflections. Similarly, the 1×N optical switch may be incorporated within the pluggable OTDR element. In particular, the 1×N optical switch may be located within a "passive" module portion of the pluggable OTDR element that houses the directional coupling elements used to provide signal direction into and out of the pluggable OTDR.

Other and further aspects of embodiments related to the shared OTDR resource will become apparent during the course of the following discussion and by reference to the accompanying drawings.

BRIEF DESCRIPTION OF THE DRAWINGS

Referring now to the drawings, where like numerals may reference like parts in several views.

DETAILED DESCRIPTION

OTDRs are becoming an essential component of optical communication networks in terms of being able to continuously monitor the health of the optical fiber spans that interconnect network nodes. For example, the measurements obtained by an OTDR may be used to improve routing algorithm capability (as function of optical loss/gain fluctuations along individual spans) as well as provide feedback to a network maintenance system with respect to the quality of the fiber itself. Recent advances in "pluggable" OTDR implementations are described in our co-pending applications and allow for the OTDR assembly to be compact enough that it may take the desired "small form factor pluggable" (SFP) form.

As discussed below, the advantages of a pluggable OTDR configuration are now leveraged to create an OTDR arrangement that may be shared among of a number of individual fiber spans; for example, shared among a plurality of separate fiber spans used to interconnect a pair of optical nodes.

In applications such as a data center where there is a need to ensure accurate data transmission, the physical "health" of each fiber span supporting data transmission is critical. OTDR measurements are a good measure of fiber quality, and may even be used to improve routing algorithm capabilities, for example. Moreover, in situations where the installed fiber plant is owned by a third party (e.g., leased to an entity providing data centers) and not under direct control of the data center entity, the ability to independently monitor the integrity of the fiber spans is important.

Figure 1:
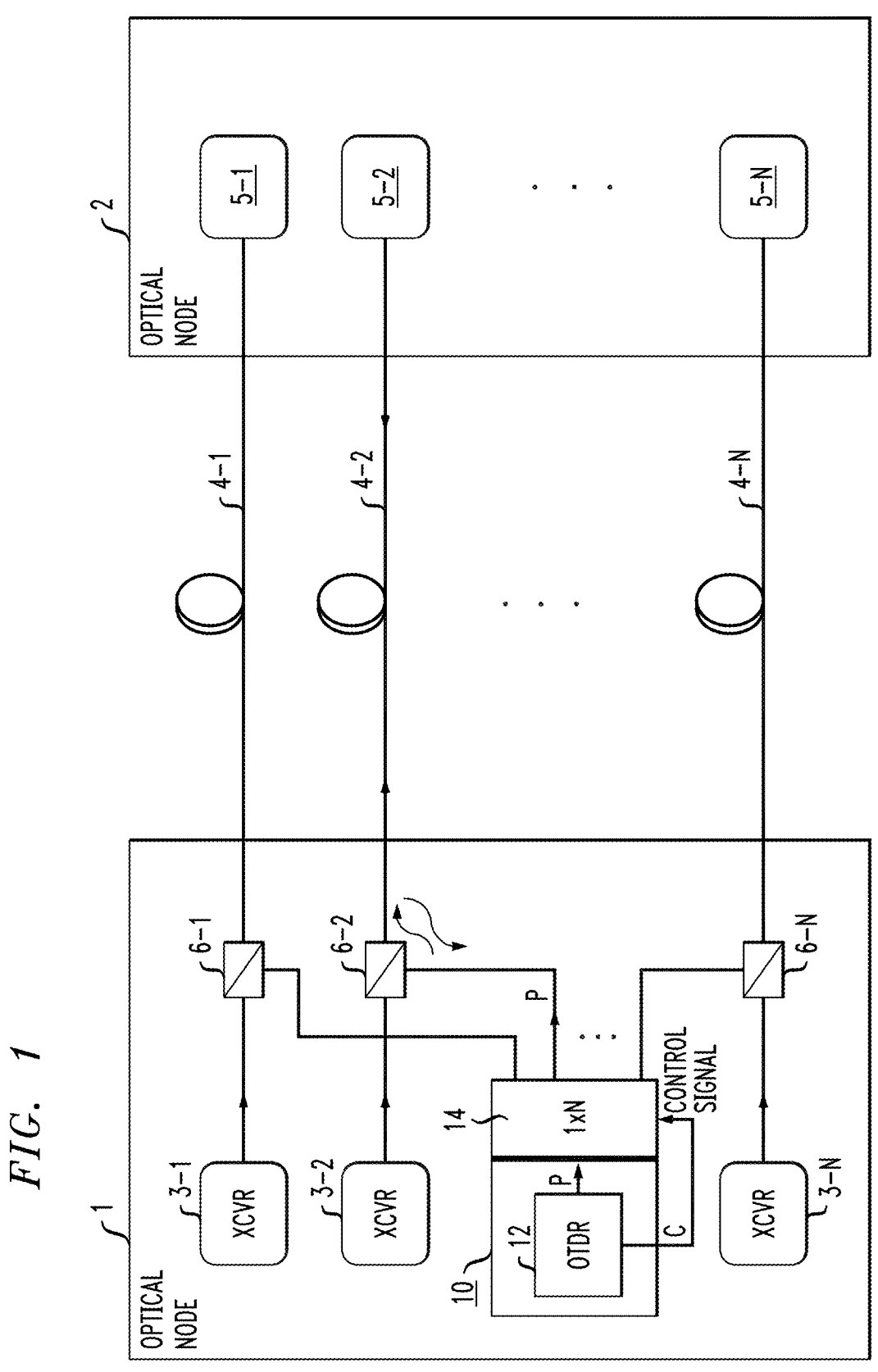
FIG. 1 is a simplified diagram of an interconnection between a pair of optical nodes, the interconnection based upon a plurality of N individual optical fiber spans and showing the inclusion of a shared OTDR resource of the present disclosure as disposed within one of the nodes and configured to individual monitor each fiber span of the plurality of N individual fiber spans.

FIG. 1 illustrates an arrangement formed in accordance with the principles of the present disclosure to provide OTDR functionality that may be shared among a plurality of individual fiber spans in a compact and efficient manner. In particular, a shared OTDR resource 10 is provided that allows for monitoring of each of a plurality of individual fiber spans that are used to interconnect a first optical node 1 and a second optical node 2 (where these nodes may be data center locations). First optical node 1 is shown as including a plurality of N individual optical transceivers 3, and second optical node 2 is shown as including a plurality of N individual optical transceivers 5, with a plurality of N fiber spans 4 used to provide communication between an identified transceiver 3-x in optical node 1 and an identified transceiver 5-x in optical node 2. In many applications, fiber spans 4 may be relatively short (in comparison to lengths of long-haul transmission cables) and used to provide high density, high speed optical signal paths. Dense wavelength division multiplexing (DWDM) may be used to support the transmission of a large number of individual signals along a single fiber span 4. Thus, the ability to continuously monitor the quality of the individual fiber spans is an important requirement.

Shared OTDR resource 10 is shown in FIG. 1 as including a pluggable OTDR element 12 that is used in combination with a 1×N optical switch 14 (N≥2). Time-based control of 1×N switch 14 by a control element within pluggable OTDR element 12 allows for the selection of a particular fiber span to be studied, with 1×N switch 14 used to direct an OTDR probe input into the designated fiber span 4-x. The return reflections are similarly directed back into pluggable OTDR element 12 for processing by the action of 1×N switch 14. A WDM 6 is disposed as shown at the output of each transceiver 3, and is also coupled to a selected one of the N outputs from 1×N optical switch 14 in the manner shown in the drawing. The use of pluggable OTDR element 12 to control the selection of 1×N switch 14 allows for the integrity of data communication along all of non-selected fiber spans, while also ensuring that the collected OTDR trace information is associated with the "selected" fiber span only.

For example and in reference to FIG. 1, a control signal C from pluggable OTDR element 12 is applied to 1×N switch 14 and instructs 1×N switch 14 to currently select fiber span 4-2 for study. The optical probe beam P generated by pluggable OTDR element 12 will thus be directed into WDM 6-2 and thereafter coupled into fiber span 4-2. The remaining fiber spans 4-1, 4-3, and 4-4 will continue to support the transmission of data between transceivers 3 and transceivers 5. Once the OTDR monitoring of fiber span 4-2 is complete (which may be recognized by the completion of the OTDR trace), OTDR element 12 may send another control signal to 1×N switch 14, changing the selection of fiber span for study. In this manner, different time slots may be assigned to different fiber spans for the performance of OTDR monitoring.

Figure 2:
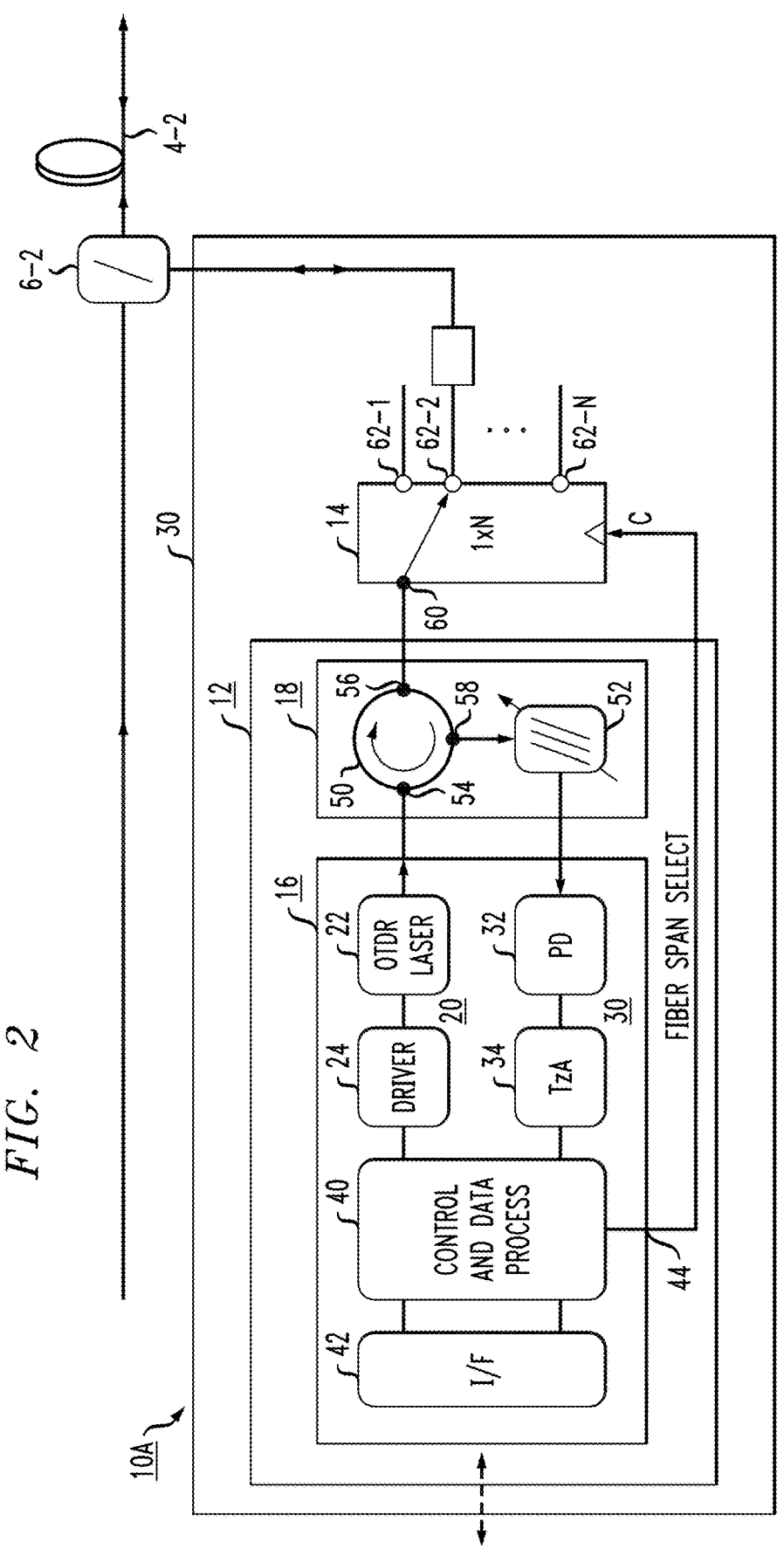
FIG. 2 is a diagram of a first embodiment of a shared OTDR resource formed in accordance with the present disclosure, in this embodiment utilizing a 1×N switch that is provided as a separate component from the pluggable OTDR element.

FIG. 2 illustrates a first embodiment 10A of the disclosed shared OTDR resource 10. In this embodiment, pluggable OTDR element 12 and 1×N optical switch 14 comprise separate components that are housed within a common package 30 to provide a compact final structure that retains the ability to be plugged into equipment such as a router. As fully described in our co-pending applications, pluggable OTDR element 12 includes a first module 16 that houses electronic components and active optical components and a second module 18 that houses passive optical components. With this separation, first module 16 is able to be configured as a compact, small form factor component compatible with the desired QSFP/OSFP requirements.

First module 16 of pluggable OTDR element 12 houses an optical transmitter 20 for providing an optical probe lightwave that is coupled into a selected fiber span 4 (as discussed in detail below) and used in a manner well-understood in the art to create back-reflected light in the return direction, where the reflected light is used to generate an OTDR trace of the selected fiber span 4 as the output from pluggable OTDR element 12. In many cases, the optical probe takes the form of an optical pulse train, but other types of optical probe signals (e.g., continuous-wave signal, a digital signal having a particular coding scheme, etc.) may be used as well. In this configuration, optical transmitter 20 comprises a laser device 22 that is activated by an electrical driver circuit 24 (which controls laser device 22 to generate either a pulsed or CW probe signal).

First module 16 of OTDR pluggable element 12 also includes an optical receiver 30 including a photodetector 32 to receive the back-reflected light and a transimpedance amplifier 34 that is used to convert the electrical current from photodetector 32 into a voltage waveform useful in further processing. A control/processor element 40 is included within first module 16 and is used to control operation of laser driver 34 and also generate the OTDR trace output by analysis of the return electrical signals from transimpedance amplifier 34. As will be described in detail below, control/processor element 40 is further used in accordance with this disclosure to provide control of 1×N optical switch 14 in a manner that allows for pluggable OTDR element 12 to be shared among a plurality of different fiber spans. An electrical interface 42 is included within first module 16 and provides bidirectional communication between pluggable OTDR element 12 and remote monitoring equipment (not shown).

Second module 18 of pluggable OTDR element 12 is shown in this embodiment as housing the passive optical elements used to control the direction of signal propagation between shared OTDR resource 10 and a selected fiber span 4 being analyzed. In this particular configuration, second module 18 includes an optical circulator 50 and a bandpass filter 52. It is to be understood that various other passive arrangements may be used in place of an optical circulator to control the directions of signal flow; for the sake of brevity the following discussion it is intended that the phrase "optical circulator" generically describes all possibilities. As one example, some arrangements may not acquire the use of a bandpass filter (and therefore element 52 is considered as optional). Additionally, in certain configurations, bandpass filter 52 may be tunable, so as to track the specific wavelength being used as an OTDR probe beam.

Optical circulator 50 is used to control/direct the signal flows between optical transmitter 20, optical receiver 30, and fiber span 4. More particularly, optical circulator 50 is configured as a three-port device, including an input port 54 coupled to the output from laser device 22, a bi-directional port 56, and an output port 58 coupled to bandpass filter 52. An optical probe beam as generated by laser device 22 will thus exit first module 16 and be applied as an input to second module 18, particularly coupled to input port 54 of optical circulator 50. This OTDR probe beam will thereafter propagate along within optical circulator 50 and exit the device at bi-directional port 56.

As particularly illustrated in FIG. 2 and in accordance with the disclosed principles of sharing the capabilities of pluggable OTDR element 12 among a plurality of separate fiber spans 14, bi-directional port 56 of optical circulator 50 is coupled to an input signal path 60 of 1×N optical switch 14. Thus, a probe beam output from pluggable OTDR element 12 (i.e., the output from laser device 22) will thereafter exit 1×N switch 14 at a selected output signal path 62-x from the plurality of N output signal paths 62 (in this example, shown as output signal path 62-2). Output signal path 62-2 is shown as coupled to WDM 6-2 in the illustration of FIG. 2 and, therefore, is coupled into fiber span 4-2, allowing for the optical probe signal to exit 1×N switch 14, pass through WDM 6-2 and be coupled into fiber span 4-2, where the probe beam is used to perform OTDR measurements of this particular fiber span.

This connection in 1×N optical switch 14 between input signal path 60 and the designated output signal path 62-x (here, 62-2) is maintained as reflections from the propagating probe return along fiber span 4-2 and are directed by WDM 6-2 back along signal path 62-2 through 1×N switch 14 and into pluggable OTDR element 12. In particular and as shown in FIG. 2, the return reflections enter second module 18 of pluggable OTDR element 12 and are directed into bi-directional port 56 of optical circulator 50. In this return direction, the reflections will propagate through optical circulator 50 and exit at output port 58, passing through bandpass filter 52 before being applied as an input to photodetector 32 of receiver 30.

In further accordance with the disclosed principles, the operation of 1×N optical switch 14 is controlled by control/processor element 40 of pluggable OTDR element 12 (or any other suitable monitoring component) to select a particular fiber span 4-x for study. A "fiber span select" control line 70 is shown in the example of FIG. 2 as coupled between a control output 44 of control/processor element 40 and a control input 14C of 1×N optical switch 14.

Thus, by implementing an ability to select a particular fiber span 4-x for study via controlling 1×N optical switch 14, pluggable OTDR element 12 may be used to perform OTDR measurements for each individual fiber span of the plurality of N fiber spans 4 that are used to connect a pair of optical nodes. By controlling the timing of the connections, a complete measurement cycle may be provided (and repeated, as necessary), allowing for pluggable OTDR element 12 to be shared by the plurality of fiber spans 4.

Figure 3:
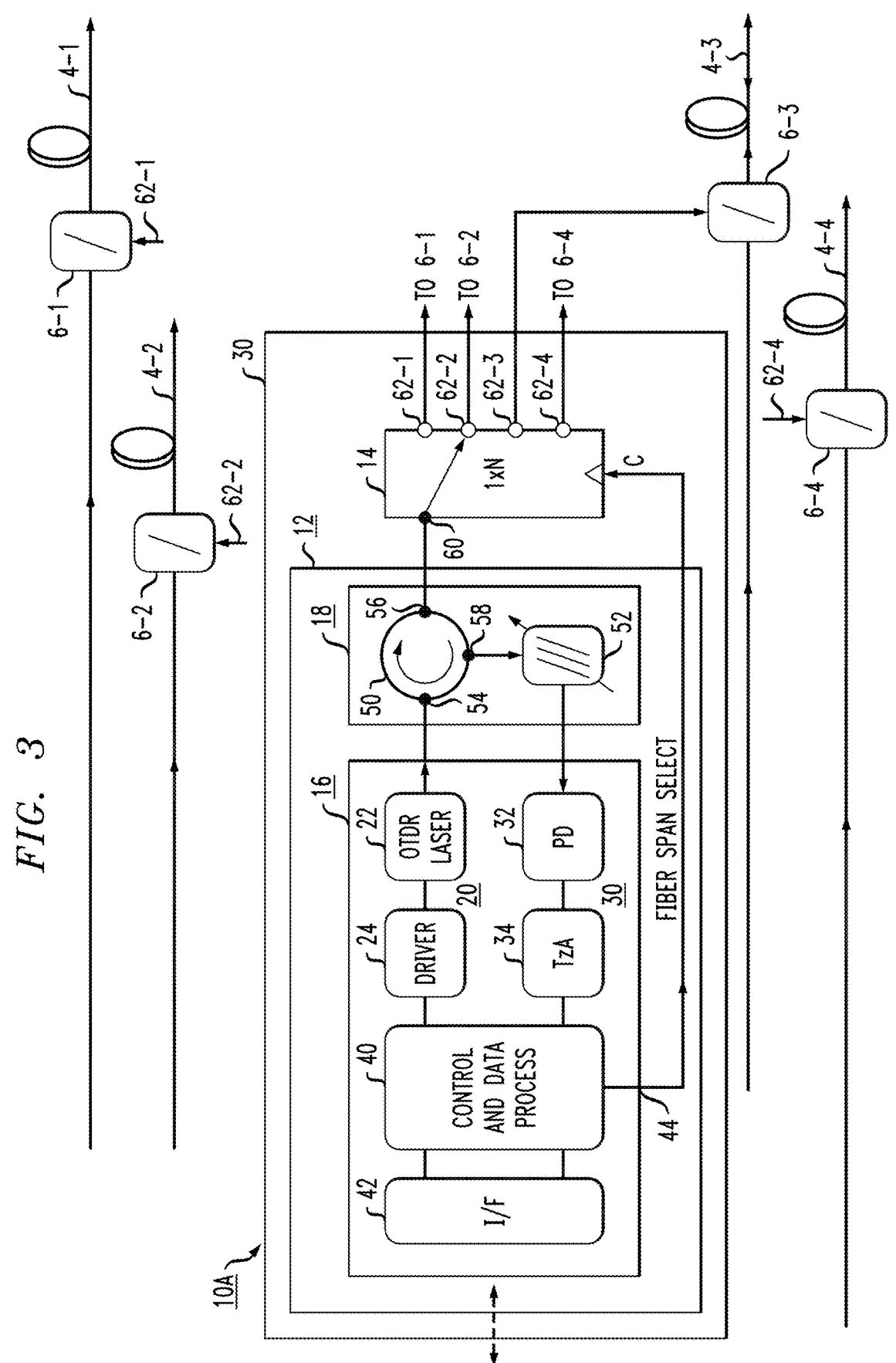
FIG. 3 is an illustration of the shared OTDR resource of FIG. 2 as disposed with a set of four individual fiber spans, showing in particular the control of the 1×N switch to select a particular fiber span for OTDR testing.

FIG. 3 further illustrates this principle in terms of configuring OTDR resource 10 to share the capabilities of pluggable OTDR element 12 among a plurality of individual fiber spans 4. The arrangement of FIG. 3 presumes an application where there is a set of four individual fiber spans 4-1 through 4-4 that are used to connect a pair of optical nodes (for example, a pair of data centers). Comparing the arrangement of FIG. 2 to that of FIG. 3, it is evident that control/processor element 40 has transmitted a "fiber span select" control signal C to 1×N optical switch 14 (in this example, a 1×4 optical switch) to connect input signal path 60 to output signal path 62-3 (i.e., change the 1→2 signal path interconnection of optical switch 14 to a 1→3 signal path interconnection). Thus, the same pluggable OTDR element 12 is used to evaluate fiber span 4-3 as was previously used to evaluate fiber span 4-2. Inasmuch as processor 40 maintains a timing record of the switch control, the generated OTDR traces will be paired with the proper designated fiber span 4.

Figure 4:
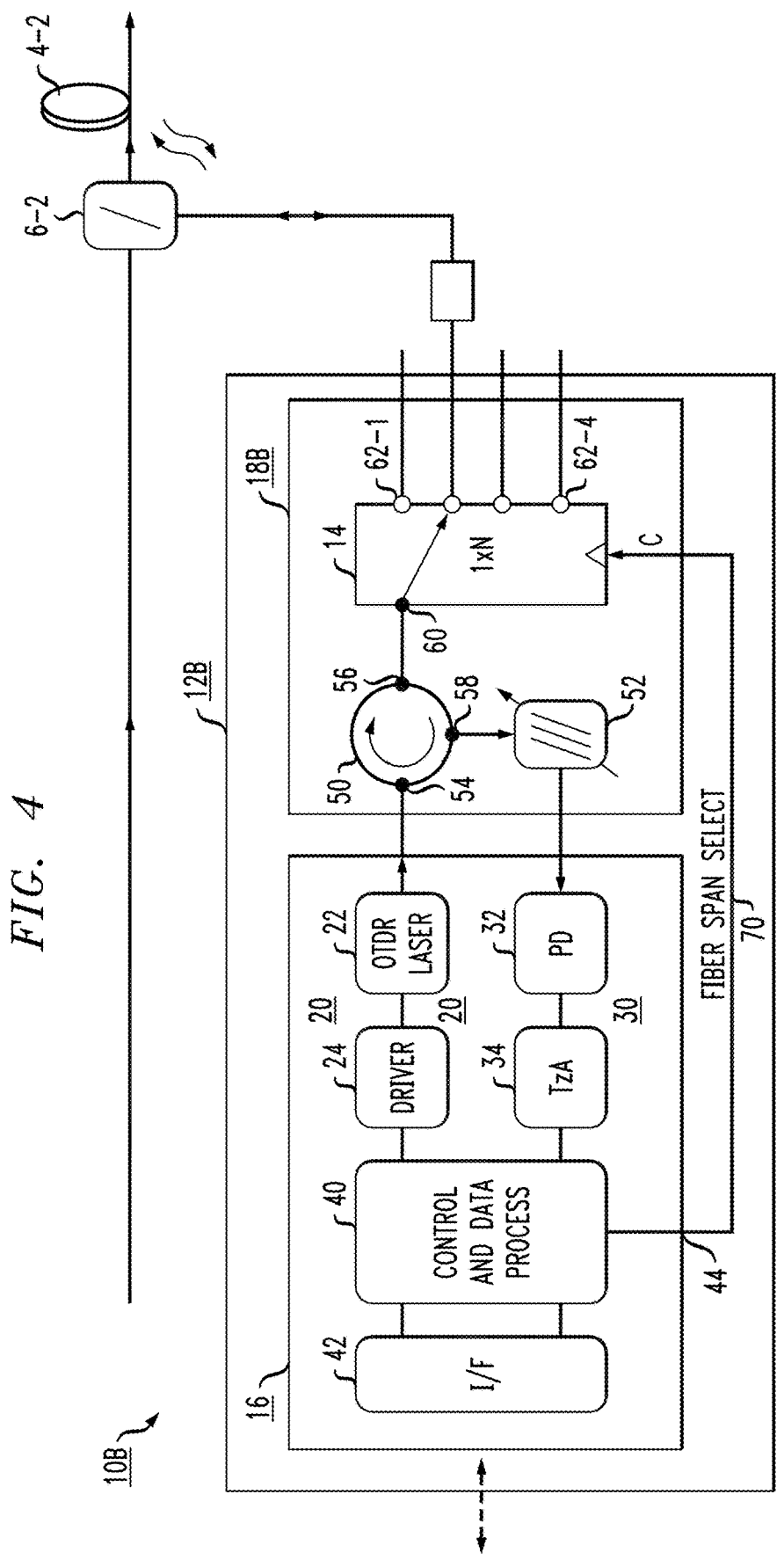
FIG. 4 illustrates a second embodiment of the shared OTDR resource of this disclosure, where in this embodiment the functionality of a 1×N switch is incorporated within the pluggable OTDR element itself (in particular within a "passive module" portion of the pluggable OTDR element.

FIG. 4 illustrates another embodiment of a shared OTDR resource formed in accordance with the present disclosure, shown here as shared OTDR resource 10B. This embodiment maintains the same ability to share OTDR functionality among a plurality of individual fiber spans as that of FIG. 2, but in this case the configuration of pluggable OTDR element 12 is modified to incorporate 1×N optical switch 14 within a modified version of second module 18 (referred to as second module 18B in this embodiment). Thus, while the embodiment of FIG. 2 may be considered as preferable when adapting an existing pluggable OTDR device to be a "shared" OTDR, the configuration of FIG. 4 may be better suited when initially assembling a pluggable OTDR component.

It is to be understood that various other pluggable configurations of OTDR functionality may be combined with a 1×N optical switch to allowed for OTDR measurement functionality to be shared between several individual fiber spans. While finding a particular use in a data center interconnect environment, the applicability of a shared, pluggable OTDR is not so limited. Indeed, any architecture that utilizes multi-slot equipment to support QSFP or OSFP-sized pluggable modules may derive benefits from having a pluggable OTDR that is so sized and able to be shared between separate fibers. Adding additional functions in Q (O) SFP format allows more optical functions to be used in the same span; OTDR is often considered as a necessary optical function that may be readily accommodated in such a pluggable arrangement.

Although the disclosed principles have been illustrated and described herein with reference to certain preferred embodiments and specific examples thereof, it will be readily apparent to those of ordinary skill in the art that other embodiments and examples may perform similar functions and/or achieve like results. All such equivalent embodiments and examples are within the spirit and scope of this disclosure, are contemplated thereby, and are intended to be covered by the claims appended hereto.

What is claimed is:

1. An optical time domain reflectometer (OTDR) resource configured to be shared among a plurality of N individual optical fiber spans, comprising:

a 1×N optical switch; and a pluggable OTDR element comprising an optical transmitter configured to produce an optical probe beam and a processor configured to control operation of the optical transmitter and the 1×N optical switch;

wherein an input path of the 1×N optical switch is coupled to an output port of the pluggable OTDR element;

wherein each one of a plurality of N separate output paths from the 1×N optical switch is coupled to a separate one of the plurality of N individual optical fiber spans; and wherein the processor is configured to generate a fiber span selection control signal that causes the 1×N optical switch to couple a specific optical fiber span of the plurality of N individual optical fiber spans to the pluggable OTDR element for OTDR testing.

2. The OTDR resource of claim 1, wherein the 1×N optical switch comprises a discrete component coupled to the output port of the pluggable OTDR element.

3. The OTDR resource of claim 1, wherein the 1×N optical switch is integrated with the pluggable OTDR element and includes a signal path formed between the output port of the pluggable OTDR element and the input path of the 1×N optical switch.

4. The OTDR resource of claim 1, wherein the pluggable OTDR element comprises:

a first module housing electrical components and active optical components utilized in performing OTDR measurements; and a second module housing passive optical components used for directing optical signals between the pluggable OTDR element and the specific optical fiber span of the plurality of N individual optical fiber spans under test.

5. The OTDR resource of claim 4, wherein the first module includes the processor utilized to control fiber span selection for OTDR testing.

6. The OTDR resource of claim 4, wherein:

the first module includes a photodetecting device;

the second module includes a three-port optical circulator having an input port responsive to the optical probe beam generated by the optical transmitter within the first module, a bi-directional optical port coupled to the input path of the 1×N optical switch, and an output port responsive to back reflections of the optical probe beam passing in a reverse direction through the 1×N optical switch; and the output port of the three-port optical circulator directs the back reflections towards the photodetecting device in the first module.

7. The OTDR resource of claim 6, wherein the second module comprises a bandpass filter disposed in a signal path between the output port of the three-port optical circulator and the photodetecting device.

8. The OTDR resource of claim 7, wherein the bandpass filter comprises a wavelength tunable bandpass filter.

9. The OTDR resource of claim 4, wherein the 1×N optical switch is disposed within the second module.

10. The OTDR resource of claim 1, comprising a plurality of N wavelength division multiplexers (WDMs); and wherein each WDM is coupled between a separate output signal path of the 1×N optical switch and a separate optical fiber span of the plurality of N individual optical fiber spans.

11. The OTDR resource of claim 1, wherein the pluggable OTDR element comprises:

an active OTDR module including:

the optical transmitter configured to generate the optical probe beam;

an optical receiver configured to accept incoming reflected lightwaves associated with the optical probe beam; and electrical process and control circuitry for energizing the optical transmitter and transforming received, reflected lightwaves into data useful in generating OTDR output traces; and a passive OTDR module including:

a directional optical coupling device coupled to the active OTDR module and configured to direct propagation of the optical probe beam toward the specific optical fiber span under test and direct reflected lightwaves attributed to the optical probe beam into the active OTDR module.

12. A pluggable optical time domain reflectometer (OTDR) element for OTDR testing a plurality of optical fiber spans, comprising:

an optical switch comprising a switch input path and a plurality of switch output paths to be coupled to ones of the plurality of optical fiber spans;

an optical transmitter configured to produce an optical probe beam; and a processor configured to control operation of the optical switch and the optical transmitter;

wherein the switch input path is optically coupled to the optical transmitter to receive the optical probe beam;

wherein the optical switch is electrically coupled to the processor to receive a fiber span selection signal; and wherein the processor, via generation of the fiber span selection signal, causes the optical switch to couple a specific one of the plurality of switch output paths and its associated optical fiber span to the switch input path so as to provide the associated optical fiber span with the optical probe beam for OTDR testing.

13. The pluggable OTDR element of claim 12, comprising:

an optical receiver; and an optical circulator comprising:

an input port configured to receive the optical probe beam generated by the optical transmitter;

a bi-directional optical port configured to provide the optical probe beam to the switch input path and to receive back reflections of the optical probe beam passing in a reverse direction through the optical switch; and an output port configured to direct the received back reflections to the optical receiver.

14. The pluggable OTDR element of claim 13, comprising a bandpass filter disposed between the output port of the optical circulator and the optical receiver.

15. The pluggable OTDR element of claim 14, wherein the bandpass filter comprises a wavelength tunable bandpass filter.

16. The pluggable OTDR element of claim 12, wherein the optical switch, the optical transmitter, and the processor are incorporated within a small form factor pluggable (SFP) module.

* * * * *